US011553303B2

(12) United States Patent
Hasegawa et al.

(10) Patent No.: US 11,553,303 B2
(45) Date of Patent: Jan. 10, 2023

(54) VEHICLE CONTROL SYSTEM AND VEHICLE CONTROL METHOD

(71) Applicant: HONDA MOTOR CO., LTD., Tokyo (JP)

(72) Inventors: Satoshi Hasegawa, Tokyo (JP); Fumiaki Yamaguchi, Tokyo (JP); Yusuke Takahashi, Tokyo (JP); Junpei Noguchi, Tokyo (JP); Gaku Shimamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 17/382,878

(22) Filed: Jul. 22, 2021

(65) Prior Publication Data

US 2022/0030384 A1 Jan. 27, 2022

(30) Foreign Application Priority Data

Jul. 27, 2020 (JP) .............................. JP2020-126714

(51) Int. Cl.
*H04W 4/40* (2018.01)
*H04W 4/02* (2018.01)
(Continued)

(52) U.S. Cl.
CPC ............. *H04W 4/023* (2013.01); *B60R 25/01* (2013.01); *B60R 25/245* (2013.01); *B60R 25/31* (2013.01); *B60R 25/403* (2013.01); *H04W 4/40* (2018.02)

(58) Field of Classification Search
CPC ...................................................... H04W 4/02
(Continued)

(56) References Cited

U.S. PATENT DOCUMENTS

2007/0229251 A1\* 10/2007 Ehrman ........... G06Q 10/06312
340/539.1
2012/0129544 A1\* 5/2012 Hodis ..................... G01S 19/34
455/456.1
(Continued)

FOREIGN PATENT DOCUMENTS

| JP | H10-266934 | 10/1998 |
| JP | 2014-054902 | 3/2014 |
| JP | 2021-135165 A | 9/2021 |

OTHER PUBLICATIONS

Japanese Office Action with English translation dated Feb. 22, 2022, 9 pages.

*Primary Examiner* — Qutbuddin Ghulamali
(74) *Attorney, Agent, or Firm* — Rankin, Hill & Clark LLP

(57) ABSTRACT

The vehicle control system includes a first position measuring unit measuring a position of a mobile terminal by performing first position measuring processing, a second position measuring unit measuring a position of the mobile terminal by performing second position measuring processing having less power consumption in a vehicle by wireless communication than that of the first position measuring processing, and a position measurement control unit handling, as monitoring areas, a first area outside the vehicle and a second area outside the first area and, if the position of the mobile terminal is within the second area, continuing measurement of a position of the mobile terminal by the second position measuring unit, and, after the position of the mobile terminal comes into the first area, switching to measurement of a position of the mobile terminal by the first position measuring unit.

8 Claims, 12 Drawing Sheets

(51) Int. Cl.
*B60R 25/31* (2013.01)
*B60R 25/40* (2013.01)
*B60R 25/01* (2013.01)
*B60R 25/24* (2013.01)

(58) Field of Classification Search
USPC .................................................. 455/456.1
See application file for complete search history.

(56) References Cited

U.S. PATENT DOCUMENTS

| | | | |
|---|---|---|---|
| 2015/0156605 A1* | 6/2015 | Skaaksrud | H04L 41/0823 |
| | | | 455/456.1 |
| 2019/0149611 A1* | 5/2019 | Mueller | H01Q 1/3275 |
| | | | 455/456.1 |
| 2019/0293439 A1* | 9/2019 | Hiruta | H04W 4/40 |
| 2020/0193748 A1* | 6/2020 | Konicek | H04M 3/42 |
| 2020/0269756 A1* | 8/2020 | Yamanaka | B60W 50/14 |
| 2020/0314610 A1* | 10/2020 | Watanabe | H04W 4/40 |
| 2020/0363820 A1* | 11/2020 | Barnes | G05D 1/0285 |
| 2021/0179020 A1* | 6/2021 | Hasegawa | G07C 5/008 |

* cited by examiner

VEHICLE CONTROL SYSTEM AND VEHICLE CONTROL METHOD

INCORPORATION BY REFERENCE

The present application claims priority under 35 U.S.C. § 119 to Japanese Patent Application No. 2020-126714 filed on Jul. 27, 2020. The content of the application is incorporated herein by reference in its entirety.

BACKGROUND OF THE INVENTION

Field of the Invention

The present invention relates to a vehicle control system and a vehicle control method.

Description of the Related Art

Conventionally, a vehicle control system has been proposed that includes a security device and an interior reader/writer in a vehicle and thus enables operations on the vehicle by using a vehicle key and a mobile terminal such as a smartphone (see Japanese Patent Laid-Open No. 2014-54902, for example). In the vehicle control system, the security device permits locking/unlocking of a door with the vehicle key if authentication of the vehicle key is succeeded within a communication area outside the vehicle. The security device further permits to start an engine of the vehicle with the vehicle key if the authentication of the vehicle key is succeeded within a communication area within the vehicle.

Also, the interior reader/writer permits operations on the vehicle (such as locking/unlocking of a door and start of the engine) with a mobile terminal carried onto the vehicle if authentication via near field communication (NFC) with the mobile terminal is succeeded.

A configuration has been proposed which, in a vehicle remote device which receives a wireless signal transmitted from a mobile transmission unit and unlocks a door of a vehicle, intermittently performs power supply to a signal processing unit that receives the wireless signal and changes the period of the power supply in accordance with the presence/absence of door locking and an elapsed time since the door locking is performed so as to reduce power consumption (see Japanese Patent Laid-Open No. 10-266934, for example).

In recent years, more telematics communication units (TCUs) have been installed in vehicles, and a system is starting to widely spread which transmits positional information and maintenance information (such as a tire inflation pressure and a travel distance) on a vehicle to an external server in real time through the TCU. Also, as described above, with some configurations, a user is enabled to remotely operate a vehicle by using a mobile terminal such as a smartphone carried by the user.

However, when power consumption by a communication device mounted in a vehicle increases for communication for implementing such functions, there is a risk that a shortage of the remaining amount of a battery for the vehicle occurs. For that, in order to prevent such occurrence of a shortage of the remaining amount of a battery for the vehicle, suppression of power consumption associated with the communication has been demanded.

The present invention has been made in view of such background, and it is an object of the present invention to provide a vehicle control system and a vehicle control method by which power consumption by communication in a vehicle can be suppressed.

SUMMARY OF THE INVENTION

As a first aspect for achieving the object above, there is provided a vehicle control system, in a vehicle performing wireless communication with a mobile terminal, controlling implementation of the wireless communication, the vehicle control system including a first position measuring unit measuring a position of the mobile terminal with respect to the vehicle by performing first position measuring processing involving implementation of the wireless communication between the mobile terminal and the vehicle, a second position measuring unit measuring a position of the mobile terminal with respect to the vehicle by performing second position measuring processing involving implementation of the wireless communication between the mobile terminal and the vehicle and having less power consumption in the vehicle by the wireless communication than that of the first position measuring processing, and a position measurement control unit handling, as monitoring areas, a first area being an area within a first predetermined distance from the vehicle outside the vehicle and a second area being an area within a second predetermined distance, which is longer than the first predetermined distance, from the vehicle outside the first area and, if a position of the mobile terminal, which is measured by the second position measuring unit, is within the second area, inhibiting measurement of a position of the mobile terminal by the first position measuring unit and continuing measurement of a position of the mobile terminal by the second position measuring unit, and, after the position of the mobile terminal, which is measured by the second position measuring unit, comes into the first area, switching from the measurement of a position of the mobile terminal by the second position measuring unit to measurement of a position of the mobile terminal by the first position measuring unit.

The vehicle control system may further include a medium-precision position measuring unit measuring a position of the mobile terminal with respect to the vehicle by performing medium-precision position measuring processing involving implementation of the wireless communication between the mobile terminal and the vehicle and having power consumption in the vehicle by the wireless communication less than that of the first position measuring processing and greater than that of the second position measuring processing. When the position of the mobile terminal, which is measured by the first position measuring unit, is within the first area and the position of the mobile terminal, which is measured by the second position measuring unit, is within the second area, the position measurement control unit may inhibit the measurement of a position of the mobile terminal by the first position measuring unit and measure a position of the mobile terminal by using the medium-precision position measuring unit, and when the position of the mobile terminal, which is measured by the medium-precision position measuring unit, comes into the first area, may switch from the measurement of a position of the mobile terminal by the medium-precision position measuring unit to the measurement of a position of the mobile terminal by the first position measuring unit.

The vehicle control system may further include a vehicle door lock/unlock request recognizing unit recognizing a lock request or an unlock request for a door of the vehicle, and a vehicle door control unit performing locking of the door in accordance with the lock request or unlocking of the door in accordance with the unlock request when the position of the mobile terminal, which is measured by the first position measuring unit, is at a predetermined position within the first area and if the lock request or the unlock request is recognized by the vehicle door lock/unlock request recognizing unit.

In the vehicle control system, the wireless communication may include wireless communication by Ultra Wide Band (UWB), and the medium-precision position measuring processing may be processing of measuring a position of the mobile terminal with respect to the vehicle by transmitting and receiving a signal by the wireless communication between the vehicle and the mobile terminal through two UWB antennas provided in the vehicle and measuring a distance between the two UWB antennas and the mobile terminal.

In the vehicle control system, the second position measuring processing may be processing of measuring a position of the mobile terminal with respect to the vehicle based on a reception strength of a signal from the mobile terminal, which is received by one antenna for the wireless communication provided in the vehicle.

In the vehicle control system, the wireless communication may include wireless communication by Ultra Wide Band (UWB), and the first position measuring processing may be processing of measuring a position of the mobile terminal with respect to the vehicle by transmitting and receiving a signal by the wireless communication with the mobile terminal through three or more UWB antennas provided in the vehicle and measuring a distance between the three or more UWB antennas and the mobile terminal.

In the vehicle control system, the second position measuring processing may be processing of measuring a position of the mobile terminal with respect to the vehicle based on a current position of the vehicle, which is detected by a position detecting unit provided in the vehicle, and a current position of the mobile terminal, which is recognized from mobile terminal positional information indicating a current position of the mobile terminal, which is transmitted from the mobile terminal to the vehicle through the wireless communication.

As a second aspect for achieving the object above, there is provided a vehicle control method to be executed by a computer for, in a vehicle performing wireless communication with a mobile terminal, controlling implementation of the wireless communication, the vehicle control method including a first position measuring step of measuring a position of the mobile terminal with respect to the vehicle by performing first position measuring processing involving implementation of the wireless communication between the mobile terminal and the vehicle, a second position measuring step of measuring a position of the mobile terminal with respect to the vehicle by performing second position measuring processing involving implementation of the wireless communication between the mobile terminal and the vehicle and having less power consumption in the vehicle by the wireless communication than that of the first position measuring processing, and a position measurement control step of handling, as monitoring areas, a first area being an area within a first predetermined distance from the vehicle outside the vehicle and a second area being an area within a second predetermined distance, which is longer than the first predetermined distance, from the vehicle outside the first area and, if a position of the mobile terminal, which is measured by the second position measuring step, is within the second area, inhibiting measurement of a position of the mobile terminal by the first position measuring step and continuing measurement of a position of the mobile terminal by the second position measuring step, and, after the position of the mobile terminal, which is measured by the second position measuring step, comes into the first area, switching from the measurement of a position of the mobile terminal by the second position measuring step to measurement of a position of the mobile terminal by the first position measuring step.

Advantageous Effect of Invention

According to the aforementioned vehicle control system, when the position of a mobile terminal, which is measured by the second position measuring unit, is within a second area outside a first area outside a vehicle and the mobile terminal is away from the vehicle to some extent, measurement of the position of the mobile terminal by a first position measuring unit, which consumes more power than that by the second position measuring unit, is inhibited, and the measurement of the position of the mobile terminal by the second position measuring unit is continued. Thus, power consumption by the communication in the vehicle can be suppressed.

DETAILED DESCRIPTION OF THE PREFERRED EMBODIMENTS

[1. Communication Processing between Vehicle and Mobile Terminal]

Figure 1:
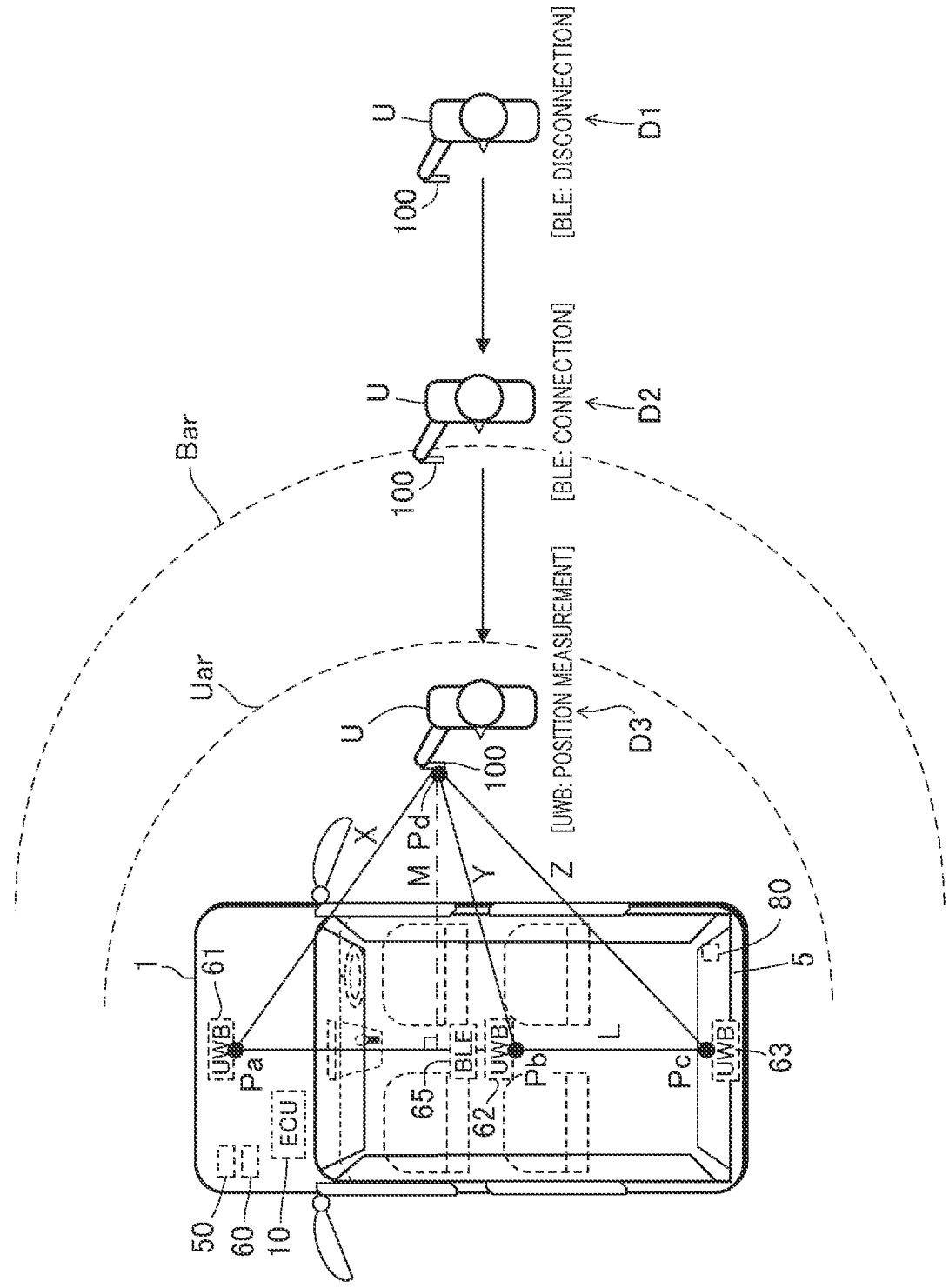
FIG. 1 is an explanatory diagram of an aspect in which a position of a mobile terminal with respect to a vehicle is measured by a vehicle control system.

With reference to FIG. 1, communication processing to be performed between a vehicle 1 in which a vehicle control system 10 is mounted and a mobile terminal 100 carried by a user of the vehicle 1 is described. The vehicle control system 10 includes an electronic control unit (ECU) as described below.

The vehicle 1 includes a narrow-area wireless communication device 60 that performs narrow-area wireless communication by Bluetooth Low Energy (BLE where "Bluetooth" is a registered trademark) and Ultra Wide Band (UWB) and a wide-area wireless communication device 50 that performs wide-area wireless communication through a public line. The wide-area wireless communication device 50 is, for example, a telematics communication unit (TCU). In the UWB communication, a band of 500 MHz to ten odd GHz (such as around an 8 GHz band) is used.

The mobile terminal 100 is, for example, a smartphone, a cellular phone, a tablet terminal or a wearable device such as a smart watch and is carried or worn by a user U for use. An electronic key application program (app) for remotely operating the vehicle 1 is installed in the mobile terminal 100, and the mobile terminal 100 functions as an electronic key including a remote operation function for the vehicle 1 by executing the electronic key app.

The vehicle 1 includes a BLE antenna 65 and UWB antennas 61, 62, 63 connected to the narrow-area wireless communication device 60. The BLE antenna 65 is arranged substantially in a center part of the vehicle 1. The UWB antenna 61 is arranged in a front part of the vehicle 1, the UWB antenna 62 is arranged in the center part of the vehicle 1, and the UWB antenna 63 is arranged in a rear part of the vehicle 1.

The vehicle control system 10 performs polling through BLE communication by controlling the narrow-area wireless communication device 60, and, when the mobile terminal 100 enters from outside (the state indicated by Reference D1) to inside (the state indicated by Reference D2) of an out-vehicle communication area Bar of BLE communication by the narrow-area wireless communication device 60, establishes wireless communication by BLE with the mobile terminal 100 within the out-vehicle communication area Bar.

The vehicle control system 10 then confirms that the mobile terminal 100 has been registered as an electronic key of the vehicle 1 by performing authentication of the electronic key on the mobile terminal 100. More specifically, the vehicle control system 10 confirms that the mobile terminal 100 has been registered as an electronic key of the vehicle 1 by comparing an authentication code transmitted from the mobile terminal 100 and an authentication code saved in a memory of the vehicle control system 10.

The vehicle control system 10 measures a vehicle-terminal distance M in order to permit use of the mobile terminal 100 as an electronic key. The vehicle control system 10 performs UWB communication through the narrow-area wireless communication device 60 with the mobile terminal 100 and measures a distance X between the UWB antenna 61 and the mobile terminal 100, a distance Y between the UWB antenna 62 and the mobile terminal 100, and a distance Z between the UWB antenna 63 and the mobile terminal 100 based on Time of Flight (ToF). Because a position Pa of the UWB antenna 61, a position Pb of the UWB antenna 62 and a position Pc of the UWB antenna 63 in the vehicle 1 are known, a relative position Pd of the mobile terminal 100 with respect to the vehicle 1 is calculated by trilateration by measuring X, Y and Z, and the vehicle-terminal distance M can thus be measured.

When communication by BLE is established between the narrow-area wireless communication device 60 and the mobile terminal 100, the vehicle control system 10 repeats the measurement of the vehicle-terminal distance M through UWB communication. When the vehicle control system 10 recognizes that the mobile terminal 100 has entered a monitoring area Uar near the vehicle 1 (the state indicated by Reference D3), the vehicle control system 10 permits use of the mobile terminal 100 as the electronic key.

Thus, the user U can unlock and lock a door of the vehicle 1, open and close an electric door (such as a power slide door, a power hinge door or a power tailgate), start the engine, turn on/off an air conditioner, and cause a buzzer to go off, for example, by operating the mobile terminal 100. The vehicle control system 10, as described below, performs processing that suppresses power consumption by communication in the vehicle 1 by switching processing for position measurement on the mobile terminal 100 in accordance with the position of the mobile terminal 100 with respect to the vehicle 1.

[2. Configurations of Vehicle and Vehicle Control System]

Figure 2:
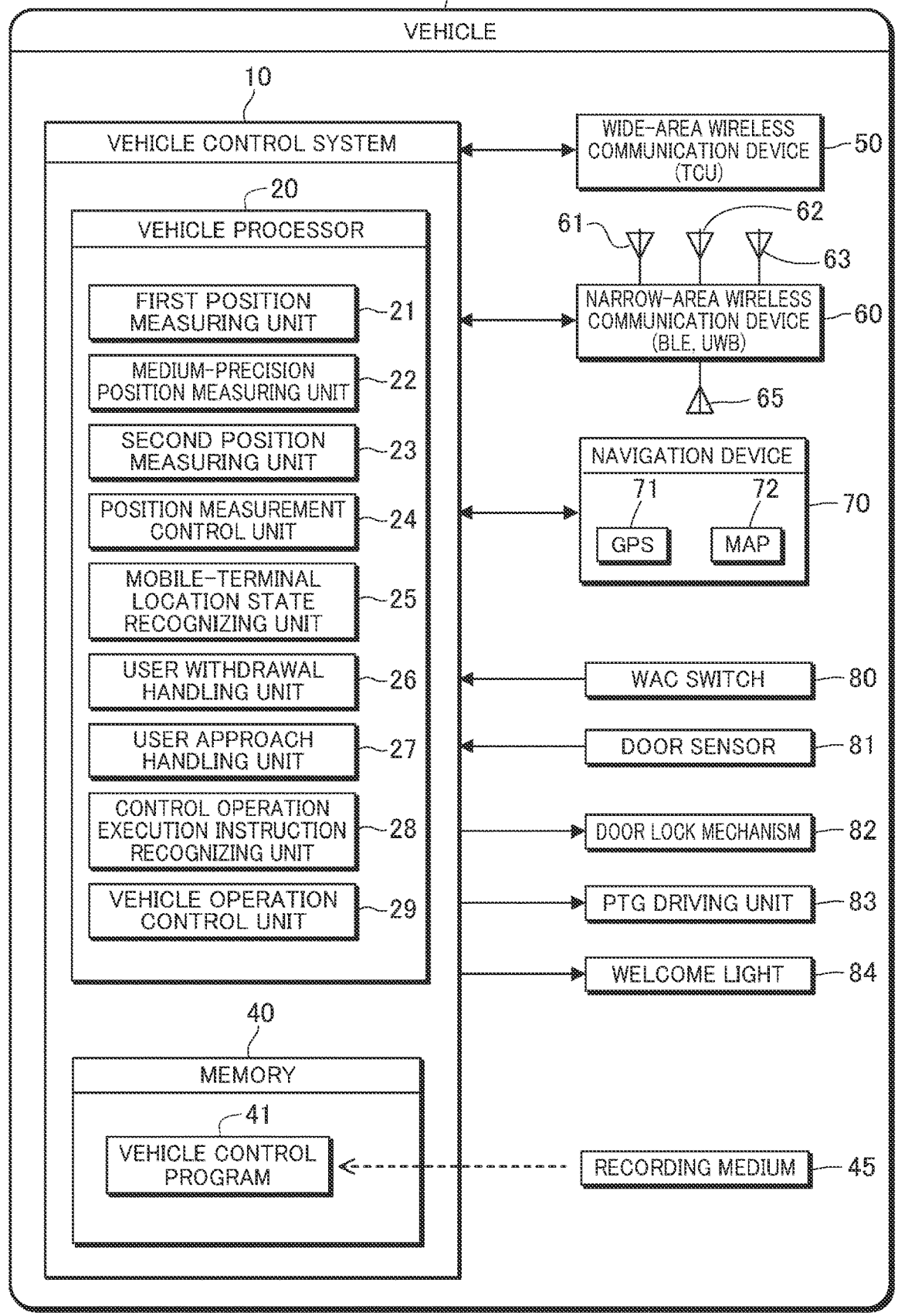
FIG. 2 is a configuration diagram of a vehicle in which the vehicle control system is mounted.

With reference to FIG. 2, configurations of the vehicle 1 and the vehicle control system 10 mounted in the vehicle 1 are described. The vehicle 1 includes a navigation device 70, a Walk Away Close (WAC) switch 80, a door sensor 81, a door lock mechanism 82, a power tailgate (PTG) driving unit 83, and a welcome light 84 in addition to the aforementioned vehicle control system 10, wide-area wireless communication device 50 and narrow-area wireless communication device 60.

The navigation device 70 includes a global positioning system (GPS) sensor 71 that detects a current position (latitude and longitude) of the vehicle 1 and map data 72 and performs, for example, route guidance to a destination. The WAC switch 80 is disposed near an opening part of a tailgate 5, as shown in FIG. 1, and is operated by the user U for opening the tailgate 5 and loading or unloading baggage to or from the vehicle 1. The tailgate 5 is an electric door to be opened and closed by the PTG driving unit 83.

When the tailgate 5 is open and the user U carrying the mobile terminal 100 operates the WAC switch 80, a WAC mode is set by the vehicle control system 10. In the WAC mode, when the user U carrying the mobile terminal 100 moves away from the vehicle 1 by a predetermined distance or longer, the vehicle control system 10 closes the tailgate 5 by operating the PTG driving unit 83. The vehicle control system 10 further locks doors of the vehicle 1 (a driver side door, a front passenger side door, rear right and left doors, the tailgate 5) via the door lock mechanism 82.

When the user U carrying the mobile terminal 100 gets off the vehicle 1 and the door sensor 81 detects that all of the doors of the vehicle 1 are closed, a WAL mode is set by the vehicle control system 10. In the WAL mode, at a time when the user U carrying the mobile terminal 100 moves away from the vehicle 1 by a predetermined distance or longer, the vehicle control system 10 locks the doors of the vehicle 1 via the door lock mechanism 82.

When it is recognized that the user U carrying the mobile terminal 100 has approached the vehicle 1, the vehicle control system 10 puts on the welcome light 84.

The vehicle control system 10 includes an ECU including a vehicle processor 20, a memory 40, an interface circuit, not shown, and so on. The vehicle processor 20 includes one or more processors. The vehicle processor 20 functions as a first position measuring unit 21, a medium-precision position measuring unit 22, a second position measuring unit 23, a position measurement control unit 24, a mobile-terminal location state recognizing unit 25, a user withdrawal handling unit 26, a user approach handling unit 27, a control operation execution instruction recognizing unit 28, and a vehicle operation control unit 29 by reading and executing a vehicle control program 41 stored in the memory 40. The control operation execution instruction recognizing unit 28 includes functionality of a vehicle door lock/unlock request recognizing unit of the present invention. The vehicle operation control unit 29 includes functionality of a vehicle door control unit of the present invention. The vehicle processor 20 corresponds to a computer of the present invention.

The vehicle control program 41 may be read from a recording medium 45 (such as an optical disk or a flash memory) recording the vehicle control program 41 to the vehicle control system 10 or may be downloaded from an external system to the vehicle control system 10 through wide-area wireless communication by the wide-area wireless communication device 50.

Processing to be performed by the first position measuring unit 21 corresponds to a first position measuring step in a vehicle control method of the present invention, and processing to be performed by the second position measuring unit 23 corresponds to a second position measuring step in the vehicle control method of the present invention. Processing to be performed by the position measurement control unit 24 corresponds to a position measurement control step in the vehicle control method of the present invention.

Figure 3:
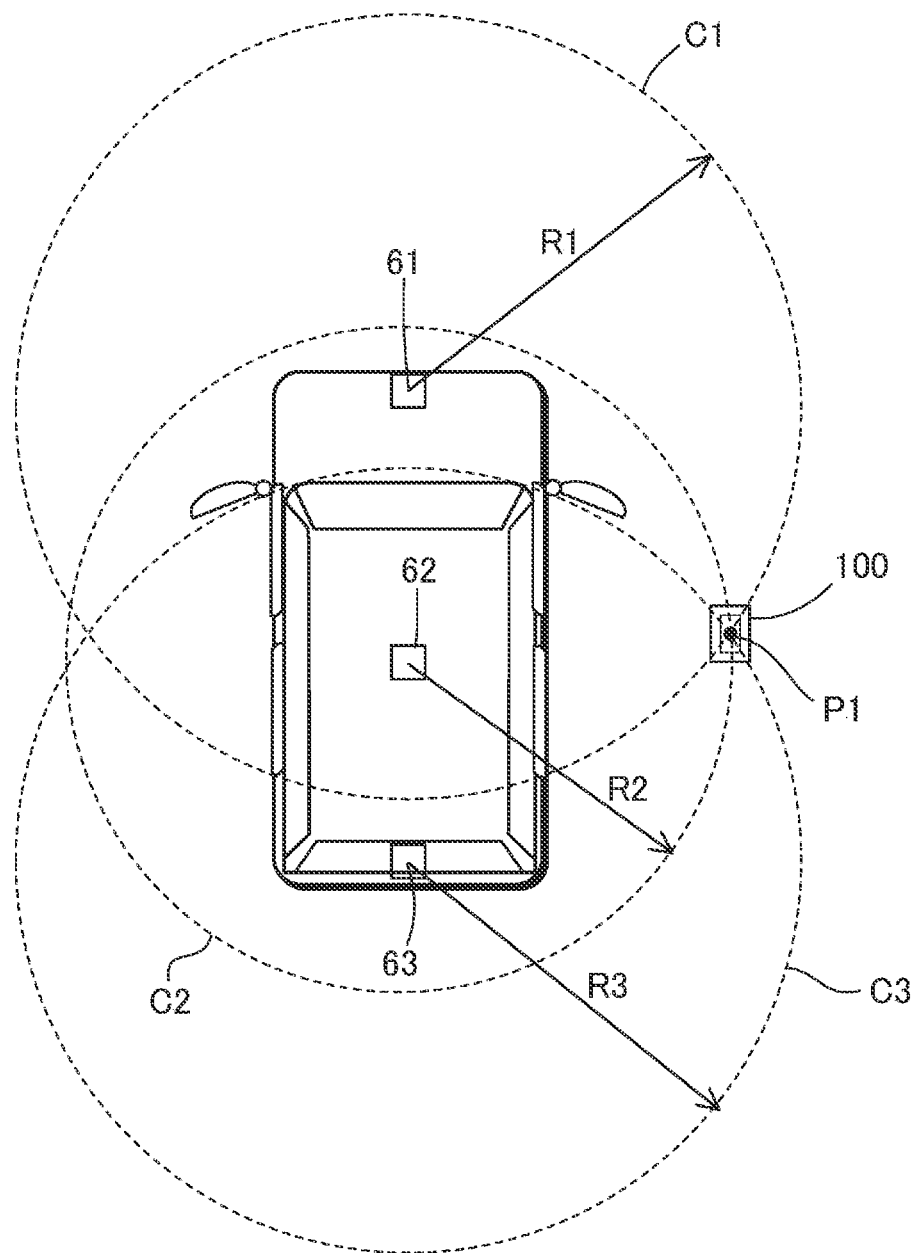
FIG. 3 is an explanatory diagram of measurement of a position of a mobile terminal by a first position measuring unit.

The first position measuring unit 21 measures a position of the mobile terminal 100 with respect to the vehicle 1 by trilateration through UWB communication described above with reference to FIG. 1. Here, FIG. 3 show an aspect of measurement of a position of the mobile terminal 100 by the first position measuring unit 21, where a measured distance between the UWB antenna 61 and the mobile terminal 100 is R1, a measured distance between the UWB antenna 62 and the mobile terminal 100 is R2, and a measured distance between the UWB antenna 63 and the mobile terminal 100 is R3. In this case, a point P1 of intersection of a circle C1 having the radius R1 about the UWB antenna 61 as its center, a circle C2 having the radius R2 about the UWB antenna 62 as its center and a circle C3 having the radius R3 about the UWB antenna 63 as its center is measured as a position of the mobile terminal 100 with respect to the vehicle 1. The processing of measurement of a position of the mobile terminal 100 by the first position measuring unit 21 corresponds to first position measuring processing of the present invention.

Figure 4:
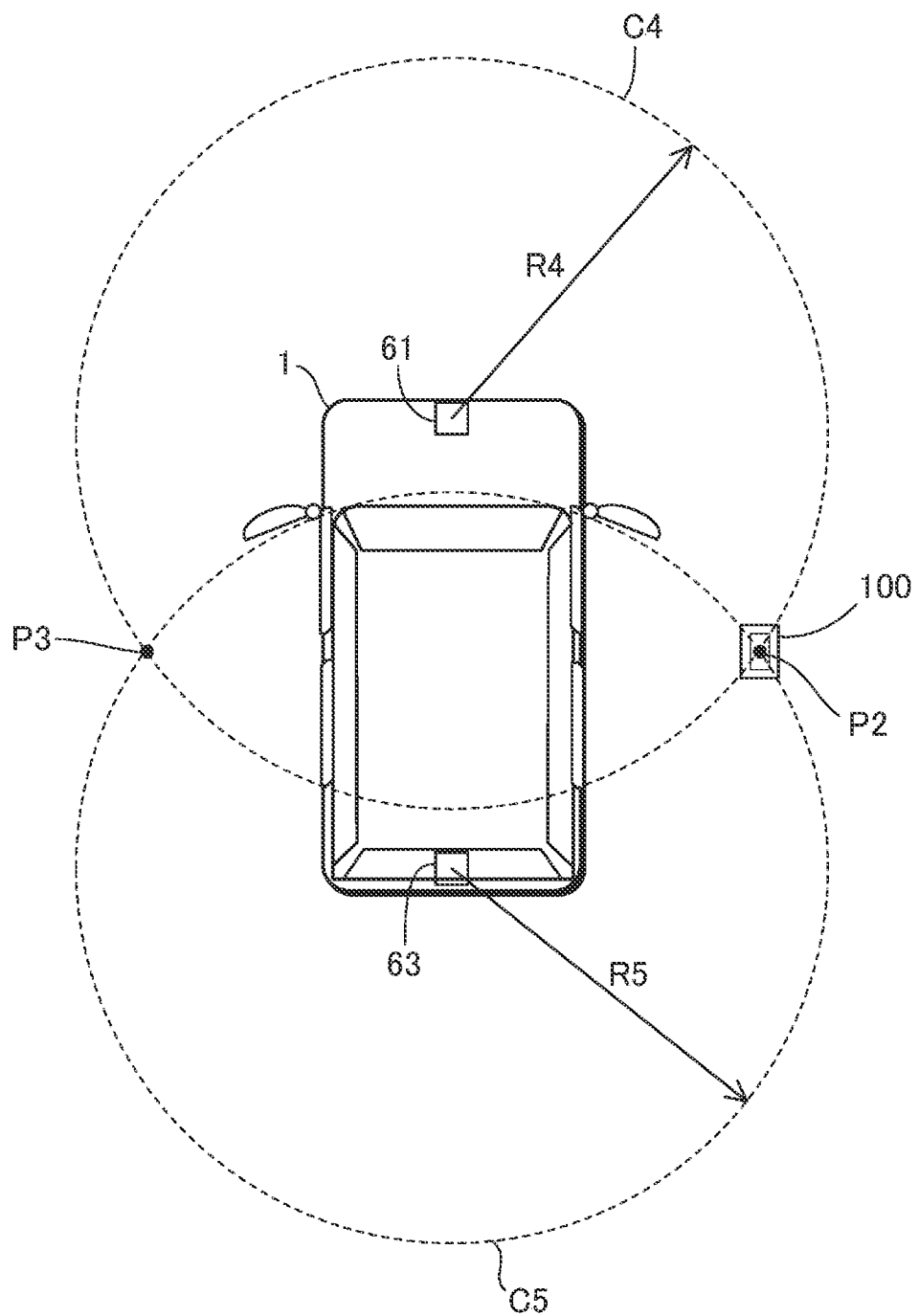
FIG. 4 is an explanatory diagram of measurement of a position of a mobile terminal by a medium-precision position measuring unit.

The medium-precision position measuring unit 22 measures a position of the mobile terminal 100 with respect to the vehicle 1 only by using the two UWB antennas 61 and 63 among the three UWB antennas 61, 62 and 63, as shown in FIG. 4. In other words, the medium-precision position measuring unit 22 measures a distance R4 between the UWB antenna 61 and the mobile terminal 100 and a distance R5 between the UWB antenna 63 and the mobile terminal 100 based on ToF.

The medium-precision position measuring unit 22 measures a point P2 or P3 of intersection of a circle C4 having the radius R4 about the UWB antenna 61 as its center and a circle C5 having the radius U5 about the UWB antenna 63 as its center as a position of the mobile terminal 100 with respect to the vehicle 1. The processing of measurement of a position of the mobile terminal 100 by the medium-precision position measuring unit 22 corresponds to medium-precision position measuring processing of the present invention.

Because, in the medium-precision position measuring processing, whether the position of the mobile terminal 100 with respect to the vehicle 1 is the point P2 or P3 cannot be identified, the precision of measurement of the position of the mobile terminal 100 is lower than that of the first position measuring processing. On the other hand, in the medium-precision position measuring processing, because UWB communication by two UWB antennas is performed, the power consumption by the wireless communication can be suppressed more than the first position measuring processing where UWB communication is performed with the three UWB antennas. A combination of the two UWB antennas may be selected arbitrarily from the UWB antennas 61, 62 and 63.

Figure 5:
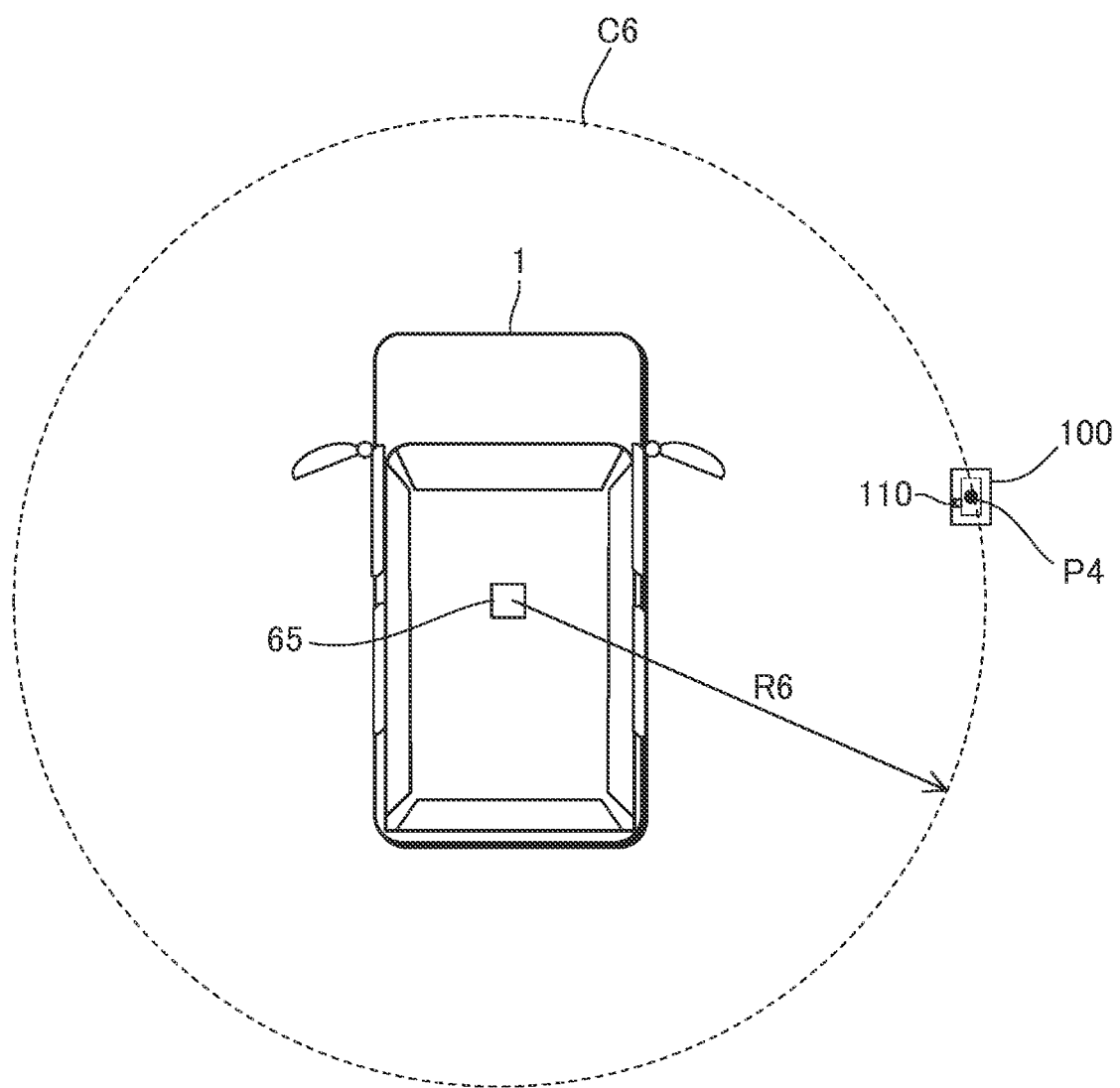
FIG. 5 is an explanatory diagram of measurement of a position of a mobile terminal by a second position measuring unit.

The second position measuring unit 23 measures a position of the mobile terminal 100 with respect to the vehicle 1 through BLE communication by one BLE antenna 65 as shown in FIG. 5. In other words, the second position measuring unit 23 measures a distance between the vehicle 1 and the mobile terminal 100 based on the reception strength by the narrow-area wireless communication device 60 of a signal transmitted from the mobile terminal 100 through BLE communication. Because the reception strength increases as the distance between the vehicle 1 and the mobile terminal 100 decreases, the distance between the vehicle 1 and the mobile terminal 100 can be measured based on the reception strength. As an index for the reception strength, for example, a received signal strength indicator (RSSI) is adopted.

The processing of measurement of a position of the mobile terminal 100 by the second position measuring unit 23 corresponds to second position measuring processing of the present invention. Because the second position measuring processing measures a distance R6 of the mobile terminal 100 to the vehicle 1, as shown in FIG. 5, a fact that the mobile terminal 100 is positioned on a circumference of the circle having the radius R6 about the BLE antenna 65 as its center can be measured. Thus, the precision of the position measurement on the mobile terminal 100 is lower than that of the medium-precision position measuring processing. On the other hand, because the one BLE antenna 65 is used and the power consumption by the BLE communication is less than that by UWB communication, the power consumption by the wireless communication can be suppressed more than that by the medium-precision position measuring processing.

Because a GPS sensor 110 is provided in the mobile terminal 100, mobile terminal positional information indicating positional information on the mobile terminal 100 detected by the GPS sensor 110 may be transmitted to the vehicle 1 through BLE communication. In this case, as the second position measuring processing, the second position measuring unit 23 performs processing of measuring a distance between the vehicle 1 and the mobile terminal 100 based on a current position of the vehicle 1 detected by the GPS sensor 71 in the navigation device 70 and a current position of the mobile terminal 100 recognized from the mobile terminal positional information.

Figure 6:
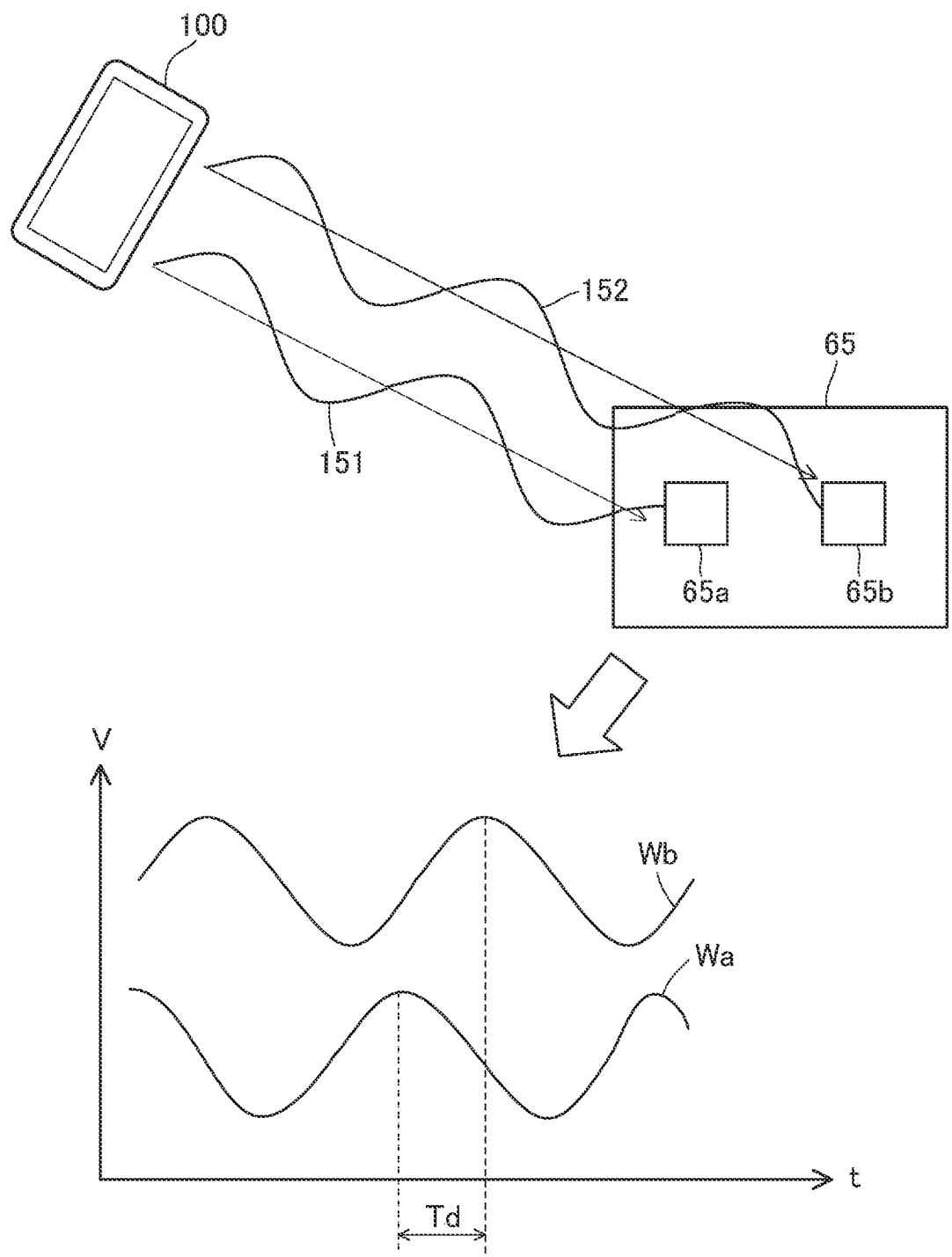
FIG. 6 is an explanatory diagram of a method for measuring a direction of a location of a mobile terminal with respect to a vehicle in measurement of a position of the mobile terminal by the medium-precision position measuring unit.

Also, as shown in FIG. 6, a BLE antenna 65 having a first sub antenna 65*a* and a second sub antenna 65*b* may be adopted. In this case, based on a time difference between reception by the first sub antenna 65*a* and the second sub antenna 65*b* of a signal transmitted through BLE communication from the mobile terminal 100, the direction where the mobile terminal 100 is positioned with respect to the vehicle 1 can be recognized.

If the mobile terminal 100 is positioned in a front part of the BLE antenna 65 and the distance between the mobile terminal 100 and the first sub antenna 65a and the distance between the mobile terminal 100 and the second sub antenna 65b are equal, no time difference occurs between the signal received by the first sub antenna 65a and the signal received by the second sub antenna 65b. On the other hand, as shown in FIG. 6, if the mobile terminal 100 is positioned in a side part of the BLE antenna 65 and the distance between the mobile terminal 100 and the first sub antenna 65a and the distance between the mobile terminal 100 and the second sub antenna 65b are different, a time difference occurs between the signal received by the first sub antenna 65a and the signal received by the second sub antenna 65b.

For that, in accordance with the time difference between the signal received by the first sub antenna 65a and the signal received by the second sub antenna 65b, the direction where the mobile terminal 100 is positioned with respect to the BLE antenna 65 can be measured. The graph shown in FIG. 6 has voltage V as a vertical axis and time t as a horizontal axis and shows voltage Wa of a signal from the mobile terminal, which is received by the first sub antenna 65a, and voltage Wb of a signal from the mobile terminal, which is received by the second sub antenna 65b. Thus, based on a time difference Td between Wa and Wb, the medium-precision position measuring unit 22 may perform the processing of measuring a direction where the mobile terminal 100 is positioned with respect to the vehicle 1 as the medium-precision position measuring processing.

Figure 7:
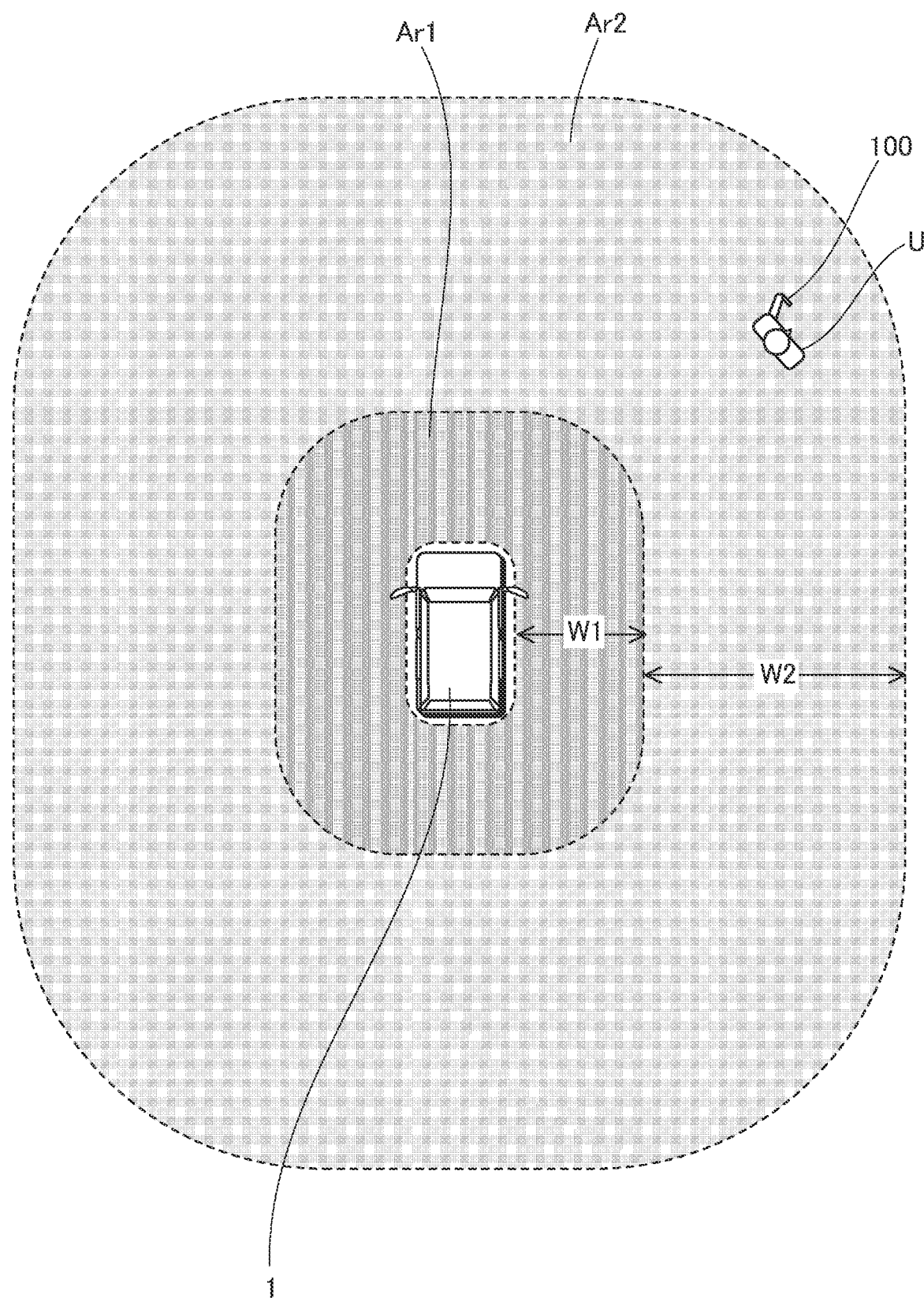
FIG. 7 is an explanatory diagram of a monitoring area for a position of a mobile terminal with respect to a vehicle.

The position measurement control unit 24, as shown in FIG. 7, switches between measurement of a position of the mobile terminal 100 with respect to the vehicle 1 by the first position measuring unit 21, measurement of a position of the mobile terminal 100 with respect to the vehicle 1 by the medium-precision position measuring unit 22 and measurement of a position of the mobile terminal 100 with respect to the vehicle 1 by the second position measuring unit 23 where a first area Ar1 near the vehicle 1 and a second area outside the first area Ar1 are monitoring areas. Details of the switching of the measurement by the position measurement control unit 24 are described below. For example, the first area Ar1 is an area having a width W1 at a distance of 0 to 5 m from the vehicle 1, and the second area Ar2 is an area having a width W2 at a distance of 5 to 30 m from the vehicle 1.

Based on the position of the mobile terminal 100 measured by the second position measuring unit 23, the mobile-terminal location state recognizing unit 25 monitors a location state of the mobile terminal 100 in the second area Ar2. When the user withdrawal handling unit 26 recognizes that the mobile terminal 100 has moved away from the vehicle 1 (when the user U carrying the mobile terminal 100 has moved away from the vehicle 1), the user withdrawal handling unit 26 performs processing of locking a door of the vehicle 1, processing of closing the tailgate 5 of the vehicle 1 and so on as withdrawal handling processing.

When the user approach handling unit 27 recognizes that the mobile terminal 100 has approached the vehicle (when the user U carrying the mobile terminal 100 has approached the vehicle 1), the user approach handling unit 27 performs processing of putting on the welcome light 84, processing of unlocking a door of the vehicle 1 and so on as approach handling processing.

The control operation execution instruction recognizing unit 28 recognizes an instruction to execute a control operation on the vehicle 1. Examples of the control operation include an operation for closing the tailgate 5 in the WAC mode, locking doors in the WAL mode, locking and unlocking of a door in accordance with an operation on a door switch (not shown) provided on, for example, a door handle of a driver side door, locking and unlocking a door in accordance with an operation by the mobile terminal 100 as an electronic key, an operation for engine start in accordance with an operation on a start switch, not shown, and so on.

The instruction to lock a door in accordance with an operation on the door switch provided on, for example, a door handle of the driver side door and the instruction to lock a door in accordance with an operation by the mobile terminal 100 as an electronic key correspond to a lock request of the present invention. The instruction to unlock a door in accordance with an operation on a door switch and an instruction to unlock a door in accordance with an operation by the mobile terminal 100 as an electronic key correspond to an unlock request of the present invention.

The vehicle operation control unit 29 executes a control operation such as locking and unlocking a door of the vehicle 1 via the door lock mechanism 82 and an engine start operation by a starter motor, not shown.

[3. Processing of Handling Case Where User Moves Away From Vehicle]

Figure 8:
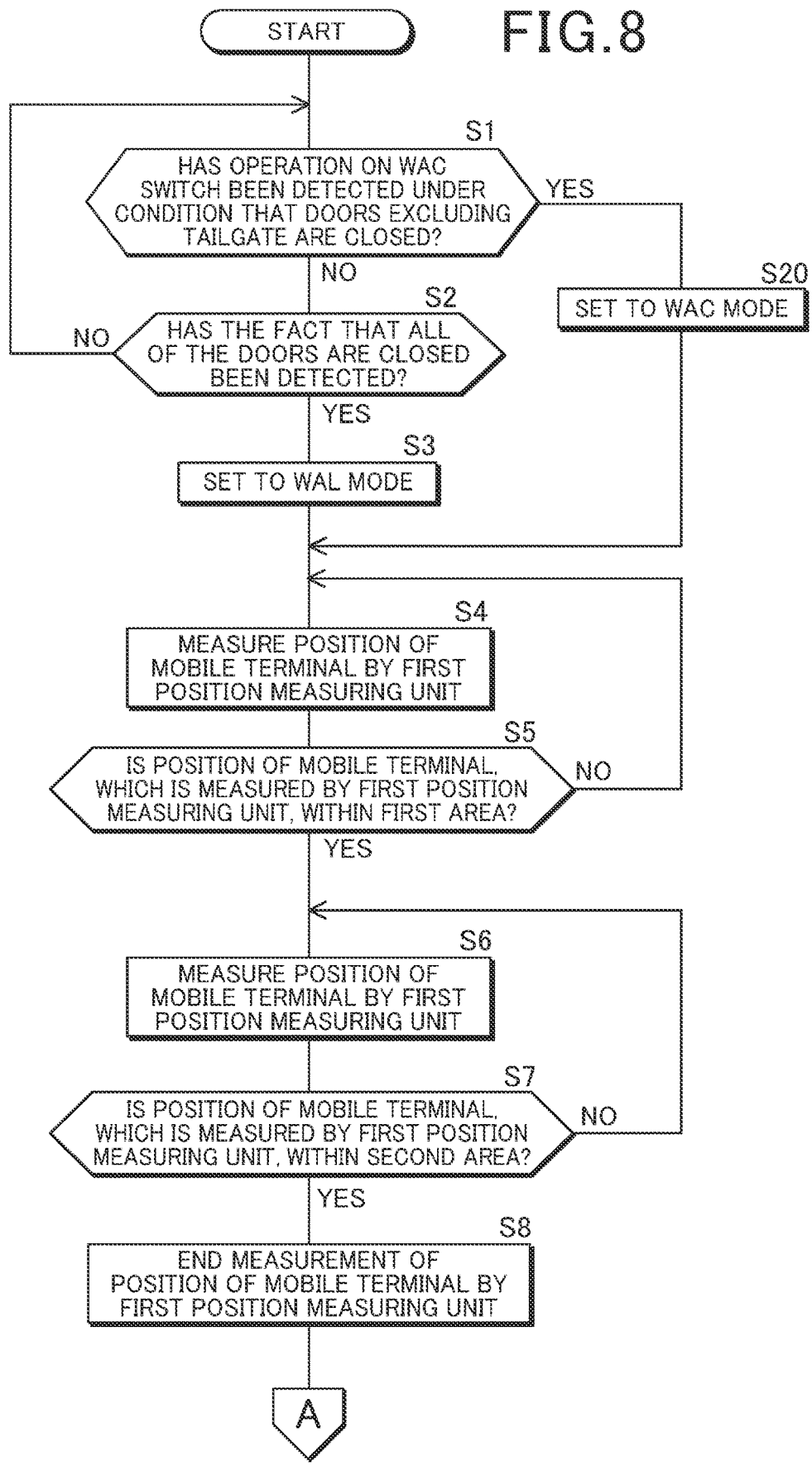
FIG. 8 is a first flowchart of processing corresponding to a case where a user moves away from a vehicle.
Figure 9:
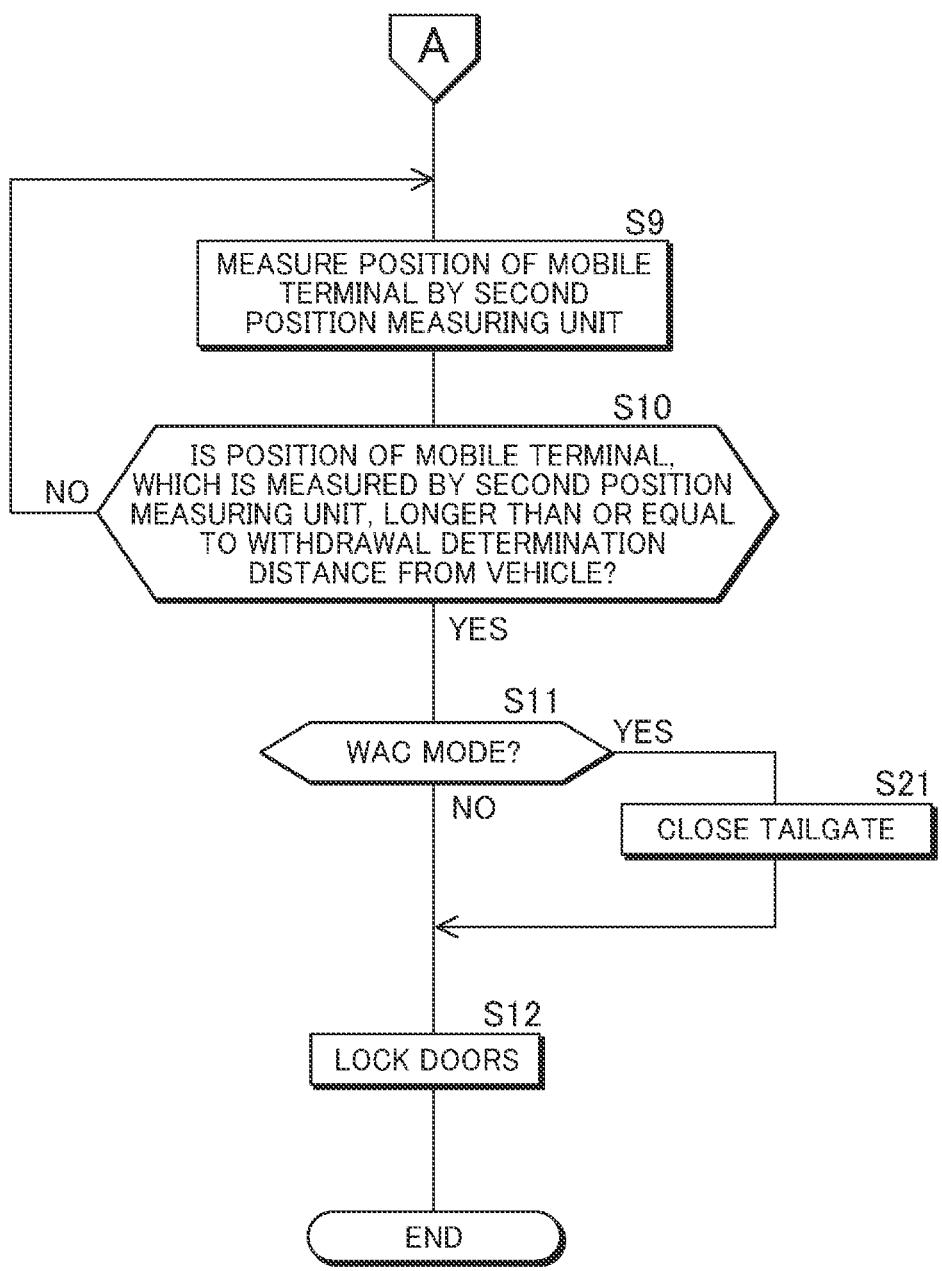
FIG. 9 is a second flowchart of processing corresponding to the case where the user moves away from the vehicle.

By following the flowcharts shown in FIG. 8 and FIG. 9, processing of handling a case where the user U moves away from the vehicle 1, which is to be executed by the vehicle control system 10, is described.

In step S1 in FIG. 8, under a condition that a fact that doors excluding the tailgate 5 of the vehicle 1 are closed has been detected by the door sensor 81, the position measurement control unit 24 determines whether an operation on the WAC switch 80 has been detected or not. If an operation on the WAC switch 80 has been detected, the position measurement control unit 24 moves the processing to step S20, and, if an operation on the WAC switch 80 has not been detected, moves the processing to step S2. In step S20, the position measurement control unit 24 sets to the WAC mode and moves the processing to step S4.

In step S2 in FIG. 8, the position measurement control unit 24 determines whether all of the doors of the vehicle 1 are closed or not based on an open/closed signal of the doors output from the door sensor 81. If all of the doors of the vehicle 1 are closed, the position measurement control unit 24 moves the processing to step S3, and, if there is any door that is not closed, moves the processing to step S1.

In step S3, the position measurement control unit 24 sets to the WAL mode. In the subsequent step S4, the position measurement control unit 24 measures a position of the mobile terminal 100 through the first position measuring unit 21. In the subsequent step S5, the position measurement control unit 24 determines whether the position of the mobile terminal 100, which is measured by the first position measuring unit 21, is within the first area Ar1 (see FIG. 7) or not. If the position of the mobile terminal 100 is within the first area Ar1, the position measurement control unit 24 moves the processing to step S6, and, if the position of the mobile terminal 100 is not within the first area Ar1, moves the processing to step S4.

In step S6, the position measurement control unit 24 measures a position of the mobile terminal 100 through the first position measuring unit 21. In the subsequent step S7, the position measurement control unit 24 determines whether the position of the mobile terminal 100, which is measured by the first position measuring unit 21, is within the second area Ar2 or not. If the position of the mobile terminal 100, which is measured by the first position measuring unit 21, is within the second area Ar2, the position measurement control unit 24 moves the processing to step S7, and, if the position of the mobile terminal 100, which is measured by the first position measuring unit 21, is not within the second area Ar2, moves the processing to step S8.

As described above, because the measurement of the position of the mobile terminal 100 by the first position measuring unit 21 is performed with high precision, the fact that the mobile terminal 100 is outside the vehicle 1, that is, the fact that the user U carrying the mobile terminal 100 has moved to outside of the vehicle can be determined with high precision in step S5. Also, in step S7, the fact that the user U has moved away from the vehicle 1 to some extent can be determined with high precision.

In step S8, the position measurement control unit 24 ends the measurement of the position of the mobile terminal 100 by the first position measuring unit 21 and moves the processing to step S9 in FIG. 9 where the measurement is switched to measurement of a position of the mobile terminal 100 by the second position measuring unit 23. As described above, the power consumption by the wireless communication for measuring the position of the mobile terminal 100 by the second position measuring unit 23 is less than that for measuring the position of the mobile terminal 100 by the first position measuring unit 21.

Therefore, after the position of the mobile terminal 100, which is measured by the first position measuring unit 21, comes into the second area Ar2 and the user U moves away from the vehicle 1 to some extent, the power consumption by the wireless communication in the vehicle 1 can be suppressed by switching to the measurement of the mobile terminal 100 by the second position measuring unit 23 in step S9.

In step S10 in FIG. 9, the mobile-terminal location state recognizing unit 25 determines whether the position of the mobile terminal 100, which is measured by the second position measuring unit 23, has changed from inside of the second area Ar2 to outside of the second area Ar2 or not. If the position of the mobile terminal 100 has changed from inside of the second area Ar2 to outside of the second area Ar2, the mobile-terminal location state recognizing unit 25 moves the processing to step S11, and, if the position of the mobile terminal 100 stays within the second area Ar2, moves the processing to step S9.

In step S11, the user withdrawal handling unit 26 determines whether the WAC mode has been set or not. If the WAC mode has been set, the user withdrawal handling unit 26 moves the processing to step S21, and, if the WAC mode has not been set (if the WAL mode has been set), moves the processing to step S12.

In step S32, the user withdrawal handling unit 26 operates the PTG driving unit 83 and thus closes the tailgate 5 and moves the processing to step S12. In step S12, the user withdrawal handling unit 26 operates the door lock mechanism 82 and thus locks all of the doors of the vehicle 1.

[4. Processing Handling Case where User Approaches Vehicle]

Figure 10:
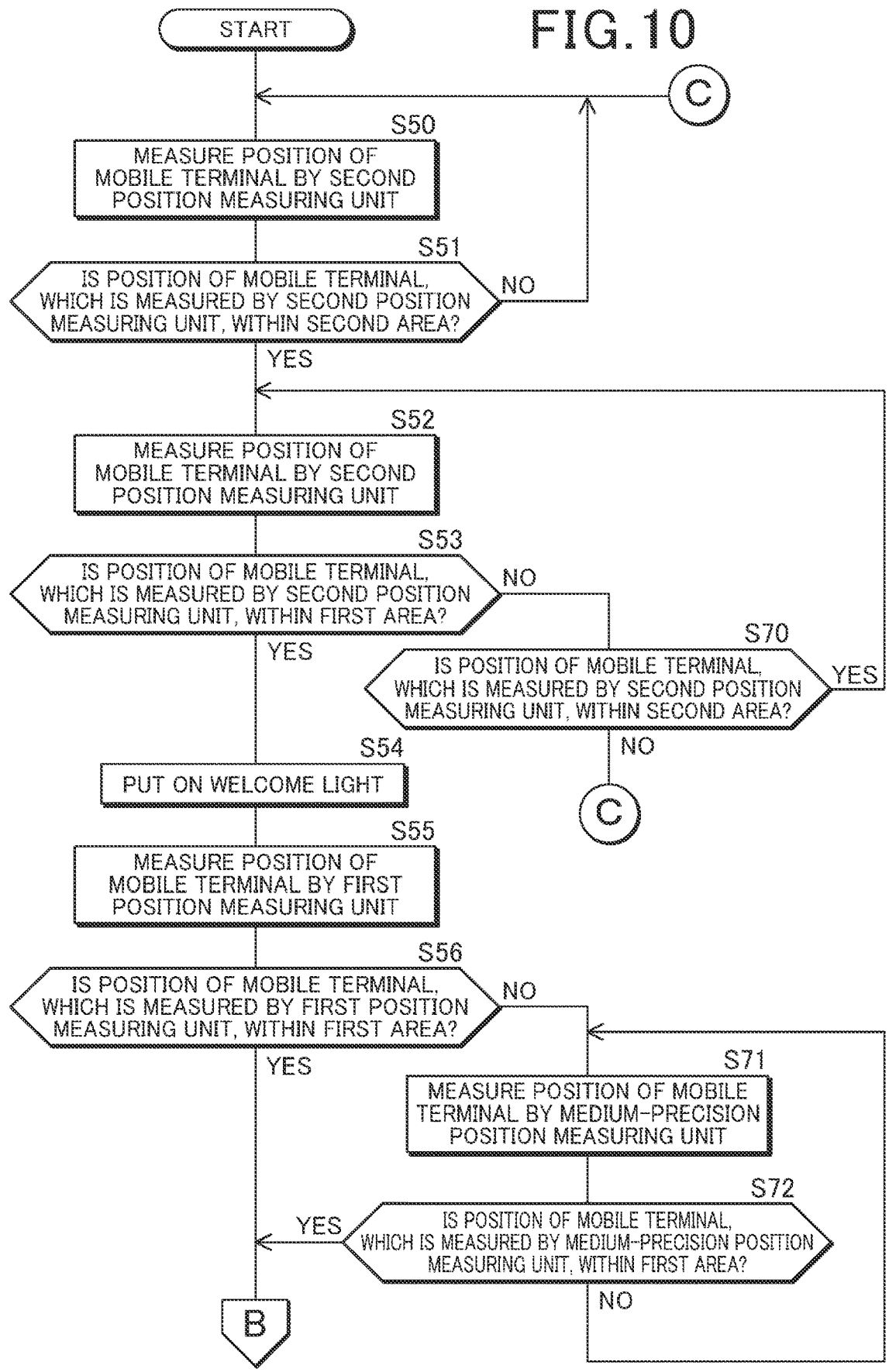
FIG. 10 is a first flowchart of processing corresponding to a case where a user approaches a vehicle.
Figure 11:
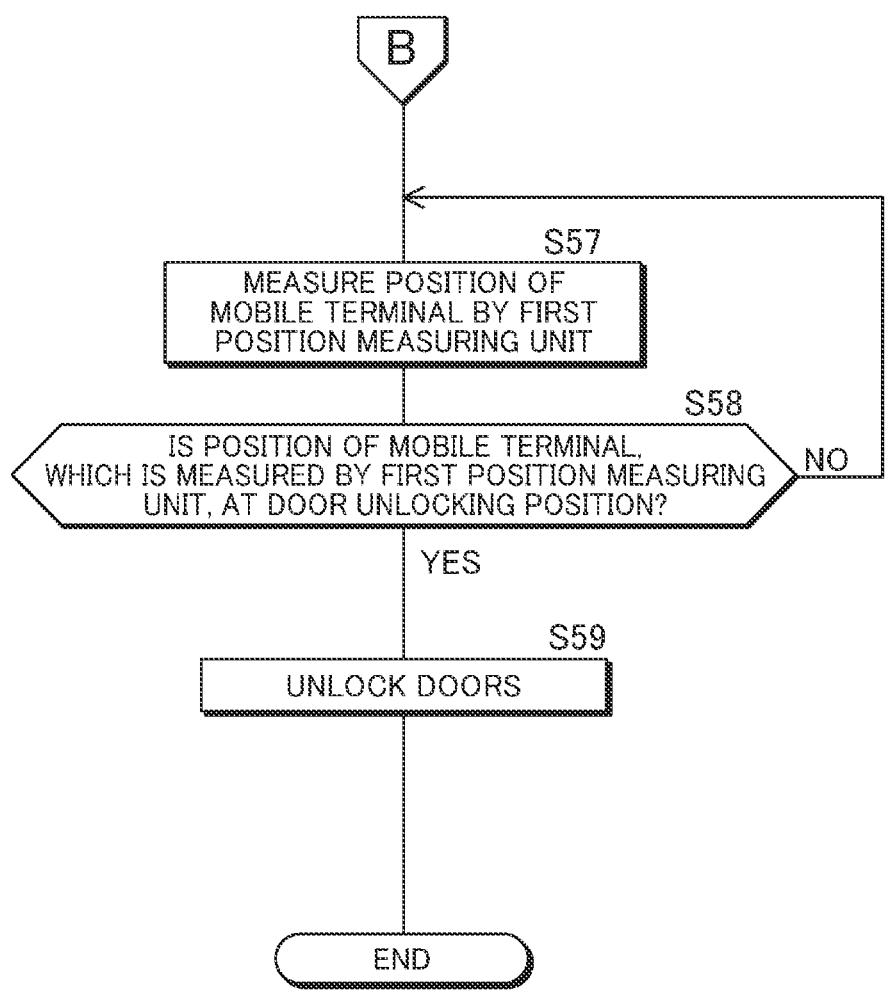
FIG. 11 is a second flowchart of processing corresponding to the case where the user approaches the vehicle.

By following the flowcharts shown in FIG. 10 and FIG. 11, processing, which is to be performed by the vehicle control system 10, of handling a case where the user U approaches the vehicle 1 is described.

In step S50 in FIG. 10, the position measurement control unit 24 measures a position of the mobile terminal 100 with respect to the vehicle 1 by using the second position measuring unit 23. In the subsequent step S51, the position measurement control unit 24 determines whether the position of the mobile terminal 100, which is measured by the second position measuring unit 23, within the second area Ar2 or not. If the position of the mobile terminal 100 is within the second area Ar2, the position measurement control unit 24 moves the processing to step S52 and, if the position of the mobile terminal 100 is not within the second area Ar2, moves the processing to step S50.

In step S52, the position measurement control unit 24 measures a position of the mobile terminal 100 with respect to the vehicle 1 by using the second position measuring unit 23. In the subsequent step S53, the position measurement control unit 24 determines whether the position of the mobile terminal 100, which is measured by the second position measuring unit 23, is within the first area Ar1 or not. The position measurement control unit 24 then moves the processing to step S54 if the position of the mobile terminal 100 is within the first area Ar1 and moves the processing to step S70 if the position of the mobile terminal 100 is not within the first area Ar1.

In step S70, the position measurement control unit 24 determines whether the position of the mobile terminal 100, which is measured by the second position measuring unit 23, is within the second area Ar2 or not. The position measurement control unit 24 moves the processing to step S52 if the position of the mobile terminal 100 is within the second area Ar2 and moves the processing to step S50 if the position of the mobile terminal 100 is outside the second area Ar2.

If, through the processing in step S50 to S53, the user U carrying the mobile terminal 100 is positioned within the second area Ar2 or outside the second area Ar2 and a position of the mobile terminal 100 with respect to the vehicle 1 is not required to be measured with very high precision, the position of the mobile terminal 100 is measured by the second position measuring unit 23 with less power consumption by the wireless communication than the measurement of the position of the mobile terminal 100 by the first position measuring unit 21 and the medium-precision position measuring unit 22. Thus, the power consumption by the communication in the vehicle 1 can be suppressed.

In step S54, the user approach handling unit 27 puts on the welcome light 84. In the subsequent step S55, the position measurement control unit 24 measures a position of the mobile terminal 100 with respect to the vehicle 1 by using the first position measuring unit 21. The position measurement control unit 24 moves the processing to step S57 in FIG. 11 if the position of the mobile terminal 100, which is measured by the first position measuring unit 21, is within the first area Ar1 and moves the processing to step S71 if the position of the mobile terminal 100, which is measured by the first position measuring unit 21, is not within the first area.

In step S71, the position measurement control unit 24 measures a position of the mobile terminal 100 with respect to the vehicle 1 by using the medium-precision position measuring unit 22. In the subsequent step S72, the position measurement control unit 24 moves the processing to step S57 in FIG. 11 if the position of the mobile terminal 100, which is measured by the medium-precision position measuring unit 22, is within the first area Ar1 and moves the processing to step S71 if the position of the mobile terminal 100, which is measured by the medium-precision position measuring unit 22, is not within the first area Ar1 (or is within the second area Ar2).

If, through the processing in step S56, S71 and S72, the position of the mobile terminal 100, which is measured by the second position measuring unit 23 in step S53, is within the first area Ar1 and the position of the mobile terminal 100, which is measured by the first position measuring unit 21 in step S56, is not within the first area Ar1, the measurement is switched to measurement by the medium-precision position measuring unit 22.

As described above, the power consumption by the wireless communication for measuring a position of the mobile terminal 100 by using the medium-precision position measuring unit 22 is less than that of measurement of a position of the mobile terminal 100 by using the first position measuring unit 21. Thus, under a condition that the position of the mobile terminal 100, which is measured by the first position measuring unit 21, is assumed not to be within the first area Ar1 but to be still within the second area Ar2, a position of the mobile terminal 100 can be measured with less power consumption than that by the first position measuring unit 21 and with higher precision than that by the second position measuring unit 23.

In step S57 in FIG. 11, the position measurement control unit 24 measures a position of the mobile terminal 100 with respect to the vehicle 1 by using the first position measuring unit 21. In the subsequent step S58, the position measurement control unit 24 determines whether the position of the mobile terminal 100, which is measured by the first position measuring unit 21, is at a door unlocking position set within the first area Ar1 or not. The door unlocking position is set in a range within a predetermined distance from the vehicle 1 within the first area Ar1.

In step S59, the user approach handling unit 27 operates the door lock mechanism 82 and thus unlocks the doors of the vehicle 1.

[5. Switching of Measurement Processing in Accordance with Type of Control Operation]

The position measurement control unit 24 performs the switching of the processing of measuring a position of the mobile terminal 100 by the first position measuring unit 21, the medium-precision position measuring unit 22 and the second position measuring unit 23, which have been described above with reference to the flowcharts shown in FIG. 8 to FIG. 11, and performs the switching of the processing of measuring a position of the mobile terminal 100 in accordance with the type of a control operation instructed to execute.

Hereinafter, processing of switching between measurement of a position of the mobile terminal 100 by the first position measuring unit 21 and measurement of a position of the mobile terminal 100 by the first position measuring unit 21 and the second position measuring unit 23 in accordance with the type of control operation instructed to execute is described by following the flowchart shown in FIG. 12.

Figure 12:
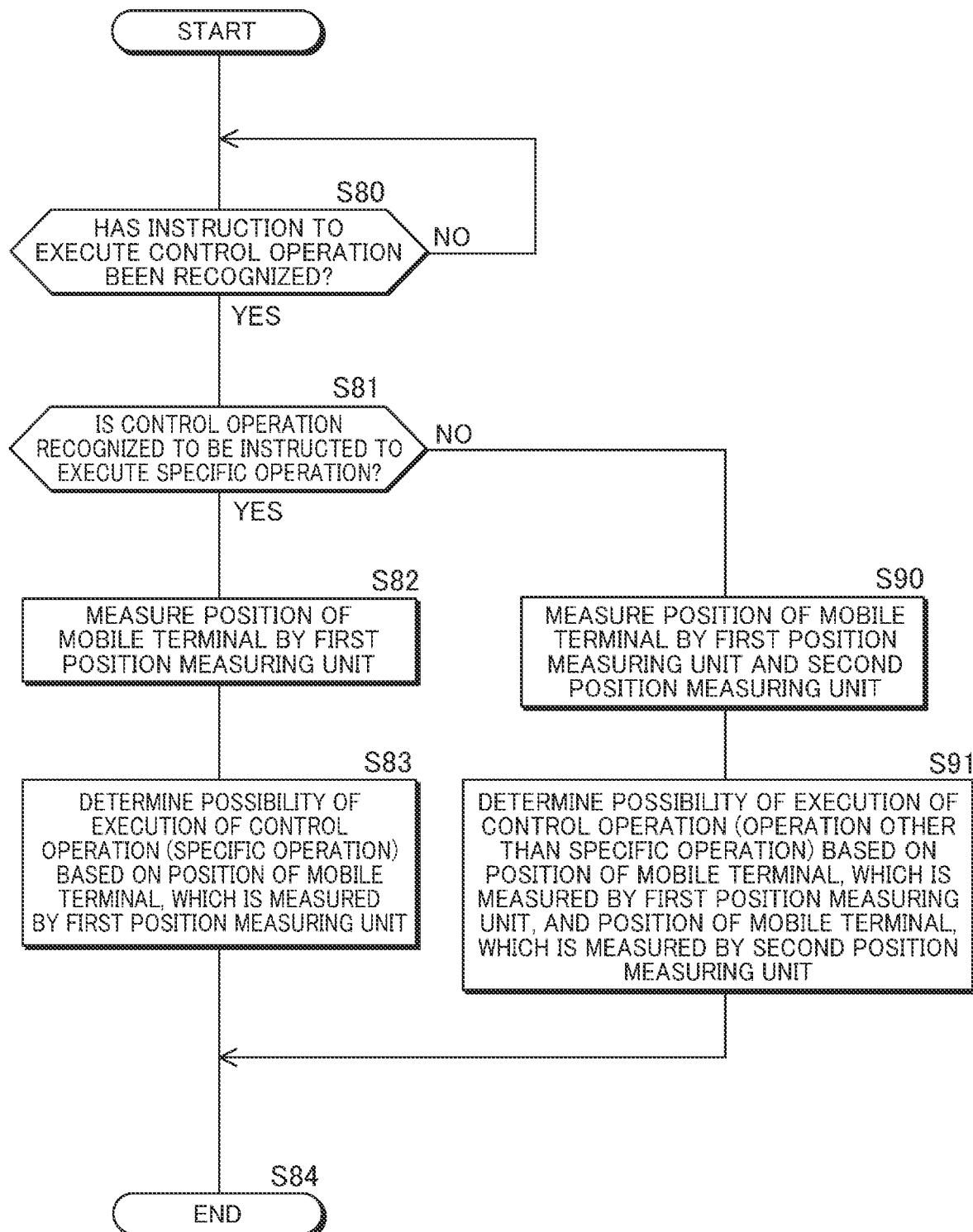
FIG. 12 is a flowchart of processing of switching between measurement of a position of a mobile terminal by the first position measuring unit and measurement of a position of the mobile terminal by the first position measuring unit and the second position measuring unit in accordance with the type of control operation in a vehicle.

In step S80 in FIG. 12, the control operation execution instruction recognizing unit 28 determines the presence of an instruction to execute a control operation in the vehicle 1, and, if there is an execution instruction, moves the processing to step S81. In step S81, the position measurement control unit 24 determines whether the type of the control operation instructed to execute is a specific operation or not. According to this embodiment, examples of the specific operation include locking and unlocking of a door in accordance with an operation on a door switch and locking and unlocking of a door in accordance with an operation by the mobile terminal 100 as an electronic key.

The position measurement control unit 24 moves the processing to step S82 if the type of the control operation instructed to execute is the specific operation and moves the processing to step S90 if the type of the control operation instructed to execute is not the specific operation. The processing in steps S90 and 91 corresponds to processing of determining a time for executing a control operation (WAL, WAC, putting on the welcome light) in the processing by the flowcharts in FIG. 8 to FIG. 11 described above.

In step S82, the position measurement control unit 24 measures a position of the mobile terminal 100 by using the first position measuring unit 21. In the subsequent step S83, the vehicle operation control unit 29 determines whether the specific operation is to be executed or not based on the position of the mobile terminal 100, which is measured by the first position measuring unit 21. More specifically, the vehicle operation control unit 29 executes the specific processing (locking or unlocking a door of the vehicle 1 or starting the engine) instructed to execute if the position of the mobile terminal 100 is within the predetermined distance set within the first area Ar1 (see FIG. 3).

Through the processing in steps S82 and S83, the fact that the position of the mobile terminal 100 is near the vehicle 1 can be determined with high precision based on the position measured by the first position measuring unit 21, and the specific processing can be executed. Also through the processing in step S90 and S91, the processing handling control operations (WAC, WAL, putting on the welcome light, and so on) which do not greatly require the required precision for the execution time according to the position of the mobile terminal 100 can be performed with reduced power consumption by the wireless communication in the vehicle 1 involved in the position measurement, compared with the case where all of the position measurements on the mobile terminal 100 are performed by using the first position measuring unit 21.

6. Other Embodiments

According to the aforementioned embodiment, the measurement of a position of the mobile terminal 100 by the first position measuring unit 21 is performed through the UWB communication by using the three UWB antennas 61, 62, and 63 shown in FIG. 3, the measurement of a position of the mobile terminal 100 by the medium-precision position measuring unit 22 is performed through the UWB communication by using the two UWB antenna 61 and 63 shown in FIG. 4, and the measurement of a position of the mobile terminal 100 by the second position measuring unit 23 is performed through the BLE communication by using the one BLE antenna 65 shown in FIG. 5.

As another embodiment, measurements of a position of the mobile terminal 100 by the first position measuring unit 21, the medium-precision position measuring unit 22, and the second position measuring unit 23 may be performed by another measurement method satisfying the following first condition and second condition.

First condition: The power consumption by wireless communication for measuring a position of the mobile terminal 100 by using the first position measuring unit 21 is larger than the power consumption by wireless communication for measuring a position of the mobile terminal 100 by using the medium-precision position measuring unit 22 and the precision of measurement of a position of the mobile terminal 100 by the first position measuring unit 21 is higher than the precision of measurement of a position of the mobile terminal 100 by the medium-precision position measuring unit 22.

Second condition: The power consumption by the wireless communication for measuring a position of the mobile terminal 100 by using the medium-precision position measuring unit 22 is larger than the power consumption by the wireless communication for measuring a position of the mobile terminal 100 by using the second position measuring unit 23, and the precision of measurement of a position of the mobile terminal 100 by the medium-precision position measuring unit 22 is higher than the precision of measurement of a position of the mobile terminal 100 by the second position measuring unit 23.

Although, according to the aforementioned embodiment, wireless communications by UWB and BLE are performed for measuring a position of the mobile terminal 100 with respect to the vehicle 1, wireless communications based on other standards may be performed.

Although, according to the aforementioned embodiments, the medium-precision position measuring unit 22 is provided in the vehicle control system 10 and a position of the mobile terminal 100 is measured by the medium-precision position measuring unit 22 in steps S71 and S72 in FIG. 10, the medium-precision position measuring unit 22 may be omitted.

Although, according to the aforementioned embodiments, the vehicle control system 10 includes an ECU mounted in the vehicle 1, a part or all of the configuration of the vehicle control system 10 may be configured by an external system. In this case, for example, information is transmitted and received between the external system and the vehicle 1 through wide-area wireless communication by the wide-area wireless communication device 50 so that the processing of measuring a position of the mobile terminal 100 with respect to the vehicle 1, which involves implementation of wireless communication in the vehicle 1, is switched.

Although, according to the aforementioned embodiment, in steps S53 and S54 in FIG. 10, the user approach handling unit 27 puts on the welcome light 84 when the position of the mobile terminal 100 comes into the first area Ar1, the welcome light 84 may be put on after it is recognized through the measurement in step S51 that the mobile terminal 100 is positioned within the second area Ar2.

According to the aforementioned embodiment, in steps S53 and S55 in FIG. 10, the position measurement control unit 24 switches to the measurement by the first position measuring unit 21 when the position of the mobile terminal 100, which is measured by the second position measuring unit 23, comes into the first area Ar1. As another embodiment, when it is recognized a plurality of number of times (such as three to eight times) that the position of the mobile terminal 100, which is measured by the second position measuring unit 23, is within the first area Ar1, the measurement may be switched to the measurement by the first position measuring unit 21.

It should be noted that FIG. 2 is a schematic diagram showing the configuration of the vehicle control system 10 by dividing them based on main processing details for easy understanding of the present invention of the subject application, but the configuration of the vehicle control system 10 may be configured based on other divisions. Processing by the constituent elements may be executed by one hardware unit or may be executed by a plurality of hardware units. The processing by the constituent elements shown in FIGS. 8 to 12 may be executed by one program or may be executed by a plurality of programs.

7. Configuration Supported by Embodiments Above

The embodiments above are specific examples of the following configuration.

(1) A vehicle control system, in a vehicle performing wireless communication with a mobile terminal, controlling implementation of the wireless communication, the vehicle control system including a first position measuring unit measuring a position of the mobile terminal with respect to the vehicle by performing first position measuring processing involving implementation of the wireless communication between the mobile terminal and the vehicle, a second position measuring unit measuring a position of the mobile terminal with respect to the vehicle by performing second position measuring processing involving implementation of the wireless communication between the mobile terminal and the vehicle and having less power consumption in the vehicle by the wireless communication than that of the first position measuring processing, and a position measurement control unit handling, as monitoring areas, a first area being an area within a first predetermined distance from the vehicle outside the vehicle and a second area being an area within a second predetermined distance, which is longer than the first predetermined distance, from the vehicle outside the first area and, if a position of the mobile terminal, which is measured by the second position measuring unit, is within the second area, inhibiting measurement of a position of the mobile terminal by the first position measuring unit and continuing measurement of a position of the mobile terminal by the second position measuring unit, and, after the position of the mobile terminal, which is measured by the second position measuring unit, comes into the first area, switching from the measurement of a position of the mobile terminal by the second position measuring unit to measurement of a position of the mobile terminal by the first position measuring unit.

According to the vehicle control system under (1), when the position of the mobile terminal, which is measured by the second position measuring unit, is within the second area outside the first area outside the vehicle and the mobile terminal is away from the vehicle to some extent, measurement of a position of the mobile terminal by the first position measuring unit, which consumes more power than the measurement by the second position measuring unit, is inhibited, and the measurement of a position of the mobile terminal by the second position measuring unit is continued. Thus, the power consumption by the communication in the vehicle can be suppressed.

(2) The vehicle control system under (1), further including a medium-precision position measuring unit measuring a position of the mobile terminal with respect to the vehicle by performing medium-precision position measuring processing involving implementation of the wireless communication between the mobile terminal and the vehicle and having power consumption in the vehicle by the wireless communication less than that of the first position measuring processing and greater than that of the second position measuring processing, wherein, when the position of the mobile terminal, which is measured by the first position measuring unit, is within the first area and the position of the mobile terminal, which is measured by the second position measuring unit, is within the second area, the position measurement control unit inhibits the measurement of a position of the mobile terminal by the first position measuring unit and measures a position of the mobile terminal by using the medium-precision position measuring unit, and when the position of the mobile terminal, which is measured by the medium-precision position measuring unit, comes into the first area, switches from the measurement of a position of the mobile terminal by the medium-precision position measuring unit to the measurement of a position of the mobile terminal by the first position measuring unit.

According to the vehicle control system under (2), by performing switching from the measurement of a position of the mobile terminal by the second position measuring unit to the measurement of a position of the mobile terminal by the first position measuring unit through the measurement of a position of the mobile terminal by the medium-precision position measuring unit, the power consumption by the communication in the vehicle can be suppressed, and the switching of the precision of measurement of a position of the mobile terminal in accordance with a distance from the vehicle can be performed in a stable manner.

(3) The vehicle control system under (1) or (2), further including a vehicle door lock/unlock request recognizing unit recognizing a lock request or an unlock request for a door of the vehicle, and a vehicle door control unit performing locking of the door in accordance with the lock request or unlocking of the door in accordance with the unlock request when the position of the mobile terminal, which is measured by the first position measuring unit, is at a predetermined position within the first area and if the lock request or the unlock request is recognized by the vehicle door lock/unlock request recognizing unit.

According to the vehicle control system under (3), limitedly when the position of the mobile terminal, which is measured by the first position measuring unit having higher precision of measurement of a position of the mobile terminal than that of the second position measuring unit, is recognized as being at the predetermined position, unlocking or locking of a door in accordance with a request to unlock or lock the door can be performed.

(4) The vehicle control system under (2), wherein the wireless communication includes wireless communication by Ultra Wide Band (UWB), and the medium-precision position measuring processing is processing of measuring a position of the mobile terminal with respect to the vehicle by transmitting and receiving a signal by the wireless communication between the vehicle and the mobile terminal through two UWB antennas provided in the vehicle and measuring a distance between the two UWB antennas and the mobile terminal.

According to the vehicle control system under (4), by limiting the number of UWB antennas to be used for measuring a position of the mobile terminal to two, the communication amount of the UWB communication involved in the measurement of a position of the mobile terminal can be reduced, and the power consumption of the communication in the vehicle can be suppressed.

(5) The vehicle control system under any one of (1) to (4), wherein the second position measuring processing is processing of measuring a position of the mobile terminal with respect to the vehicle based on a reception strength of a signal from the mobile terminal, which is received by one antenna for the wireless communication provided in the vehicle.

According to the vehicle control system under (5), by measuring a position of the mobile terminal based on the reception strength of a signal in the wireless communication by one antenna, the amount of communication involved in the measurement of a position of the mobile terminal can be reduced, and the power consumption of the communication in the vehicle can be suppressed.

(6) The vehicle control system according to any one of (1) to (5), wherein the wireless communication includes wireless communication by Ultra Wide Band (UWB), and the first position measuring processing is processing of measuring a position of the mobile terminal with respect to the vehicle by transmitting and receiving a signal by the wireless communication with the mobile terminal through three or more UWB antennas provided in the vehicle and measuring a distance between the three or more UWB antennas and the mobile terminal.

According to the vehicle control system under (6), by measuring the distance between the three or more UWB antennas and the mobile terminal, the position of the mobile terminal with respect to the vehicle can be measured with high precision.

(7) The vehicle control system according to any one of (1) to (6), wherein the second position measuring processing is processing of measuring a position of the mobile terminal with respect to the vehicle based on a current position of the vehicle, which is detected by a position detecting unit provided in the vehicle, and a current position of the mobile terminal, which is recognized from mobile terminal positional information indicating a current position of the mobile terminal, which is transmitted from the mobile terminal to the vehicle through the wireless communication.

According to the vehicle control system under (7), because the wireless communication between the vehicle and the mobile terminal, which is involved in the measurement of a position of the mobile terminal, only requires transmission of the mobile terminal positional information from the mobile terminal to the vehicle, the power consumption of the communication in the vehicle can be suppressed.

(8) A vehicle control method to be executed by a computer for, in a vehicle performing wireless communication with a mobile terminal, controlling implementation of the wireless communication, the vehicle control method including a first position measuring step of measuring a position of the mobile terminal with respect to the vehicle by performing first position measuring processing involving implementation of the wireless communication between the mobile terminal and the vehicle, a second position measuring step of measuring a position of the mobile terminal with respect to the vehicle by performing second position measuring processing involving implementation of the wireless communication between the mobile terminal and the vehicle and having less power consumption in the vehicle by the wireless communication than that of the first position measuring processing, and a position measurement control step of handling, as monitoring areas, a first area being an area within a first predetermined distance from the vehicle outside the vehicle and a second area being an area within a second predetermined distance, which is longer than the first predetermined distance, from the vehicle outside the first area and, if a position of the mobile terminal, which is measured by the second position measuring step, is within the second area, inhibiting measurement of a position of the mobile terminal by the first position measuring step and continuing measurement of a position of the mobile terminal by the second position measuring step, and, after the position of the mobile terminal, which is measured by the second position measuring step, comes into the first area, switching from the measurement of a position of the mobile terminal by the second position measuring step to measurement of a position of the mobile terminal by the first position measuring step.

By executing the vehicle control method under (8) by the computer, the same operational effects as those of the vehicle control system under (1) can be acquired.

REFERENCE SIGNS LIST

1: vehicle, 10: vehicle control system, 20: vehicle processor, 21: first position measuring unit, 22: medium-precision position measuring unit, 23: second position measuring unit, 24: position measurement control unit, 25: mobile-terminal location state recognizing unit, 26: user withdrawal handling unit, 27: user approach handling unit, 28: control operation execution instruction recognizing unit, 29: vehicle operation control unit, 40: memory, 41: vehicle control program, 50: wide-area wireless communication device, 60: narrow-area wireless communication device, 61, 62, 63: UWB antenna, 65: BLE antenna, 100: mobile terminal, Ar1: first area, Ar2: second area, U: user

What is claimed is:

1. A vehicle control system, in a vehicle performing wireless communication with a mobile terminal, controlling implementation of the wireless communication, the vehicle control system comprising:
    a first position measuring unit measuring a position of the mobile terminal with respect to the vehicle by performing first position measuring processing involving implementation of the wireless communication between the mobile terminal and the vehicle;
    a second position measuring unit measuring a position of the mobile terminal with respect to the vehicle by performing second position measuring processing involving implementation of the wireless communication between the mobile terminal and the vehicle and having less power consumption in the vehicle by the wireless communication than that of the first position measuring processing; and
    a position measurement control unit handling, as monitoring areas, a first area being an area within a first predetermined distance from the vehicle outside the vehicle and a second area being an area within a second predetermined distance, which is longer than the first predetermined distance, from the vehicle outside the first area and, if a position of the mobile terminal, which is measured by the second position measuring unit, is within the second area, inhibiting measurement of a position of the mobile terminal by the first position measuring unit and continuing measurement of a position of the mobile terminal by the second position measuring unit, and, after the position of the mobile terminal, which is measured by the second position measuring unit, comes into the first area, switching from the measurement of a position of the mobile terminal by the second position measuring unit to measurement of a position of the mobile terminal by the first position measuring unit.

2. The vehicle control system according to claim 1, further comprising:
    a medium-precision position measuring unit measuring a position of the mobile terminal with respect to the vehicle by performing medium-precision position measuring processing involving implementation of the wireless communication between the mobile terminal and the vehicle and having power consumption in the vehicle by the wireless communication less than that of the first position measuring processing and greater than that of the second position measuring processing,
    wherein, when the position of the mobile terminal, which is measured by the first position measuring unit, is within the first area and the position of the mobile terminal, which is measured by the second position measuring unit, is within the second area, the position measurement control unit inhibits the measurement of a position of the mobile terminal by the first position measuring unit and measures a position of the mobile terminal by using the medium-precision position measuring unit, and when the position of the mobile terminal, which is measured by the medium-precision position measuring unit, comes into the first area, switches from the measurement of a position of the mobile terminal by the medium-precision position measuring unit to the measurement of a position of the mobile terminal by the first position measuring unit.

3. The vehicle control system according to claim 2, wherein
    the wireless communication includes wireless communication by Ultra Wide Band (UWB), and
    the medium-precision position measuring processing is processing of measuring a position of the mobile terminal with respect to the vehicle by transmitting and receiving a signal by the wireless communication between the vehicle and the mobile terminal through two UWB antennas provided in the vehicle and measuring a distance between the two UWB antennas and the mobile terminal.

4. The vehicle control system according to claim 1, further comprising:
    a vehicle door lock/unlock request recognizing unit recognizing a lock request or an unlock request for a door of the vehicle; and
    a vehicle door control unit performing locking of the door in accordance with the lock request or unlocking of the door in accordance with the unlock request when the position of the mobile terminal, which is measured by the first position measuring unit, is at a predetermined position within the first area and if the lock request or the unlock request is recognized by the vehicle door lock/unlock request recognizing unit.

5. The vehicle control system according to claim 1,
    wherein the second position measuring processing is processing of measuring a position of the mobile terminal with respect to the vehicle based on a reception strength of a signal from the mobile terminal, which is received by one antenna for the wireless communication provided in the vehicle.

6. The vehicle control system according to claim 1, wherein
    the wireless communication includes wireless communication by Ultra Wide Band (UWB), and
    the first position measuring processing is processing of measuring a position of the mobile terminal with respect to the vehicle by transmitting and receiving a signal by the wireless communication with the mobile terminal through three or more UWB antennas provided in the vehicle and measuring a distance between the three or more UWB antennas and the mobile terminal.

7. The vehicle control system according to claim 1, wherein the second position measuring processing is processing of measuring a position of the mobile terminal with respect to the vehicle based on a current position of the vehicle, which is detected by a position detecting unit provided in the vehicle, and a current position of the mobile terminal, which is recognized from mobile terminal positional information indicating a current position of the mobile terminal, which is transmitted from the mobile terminal to the vehicle through the wireless communication.

8. A vehicle control method to be executed by a computer for, in a vehicle performing wireless communication with a mobile terminal, controlling implementation of the wireless communication, the vehicle control method comprising:

a first position measuring step of measuring a position of the mobile terminal with respect to the vehicle by performing first position measuring processing involving implementation of the wireless communication between the mobile terminal and the vehicle;

a second position measuring step of measuring a position of the mobile terminal with respect to the vehicle by performing second position measuring processing involving implementation of the wireless communication between the mobile terminal and the vehicle and having less power consumption in the vehicle by the wireless communication than that of the first position measuring processing; and a position measurement control step of handling, as monitoring areas, a first area being an area within a first predetermined distance from the vehicle outside the vehicle and a second area being an area within a second predetermined distance, which is longer than the first predetermined distance, from the vehicle outside the first area and, if a position of the mobile terminal, which is measured by the second position measuring step, is within the second area, inhibiting measurement of a position of the mobile terminal by the first position measuring step and continuing measurement of a position of the mobile terminal by the second position measuring step, and, after the position of the mobile terminal, which is measured by the second position measuring step, comes into the first area, switching from the measurement of a position of the mobile terminal by the second position measuring step to measurement of a position of the mobile terminal by the first position measuring step.

* * * * *